Patented July 24, 1923.

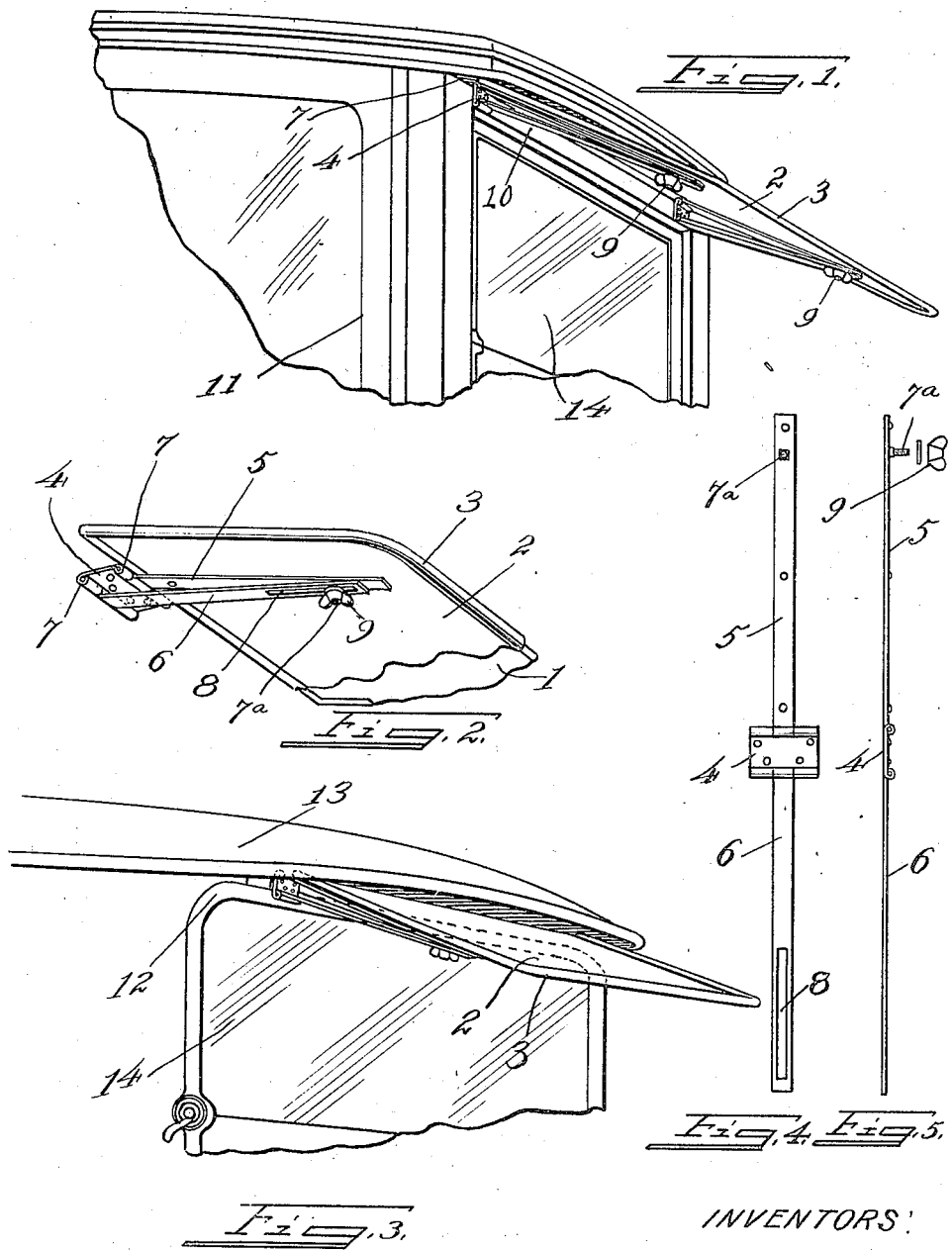

1,462,726

UNITED STATES PATENT OFFICE.

HENRY W. VOSS AND CHARLES A. BALZER, OF CINCINNATI, OHIO, ASSIGNORS TO THE MONARCH CARRIAGE GOODS COMPANY, OF CINCINNATI, OHIO, A CORPORATION OF OHIO.

GLARE SHIELD FOR AUTOMOBILES.

Application filed November 22, 1920. Serial No. 425,676.

*To all whom it may concern:*

Be it known that we, HENRY W. VOSS and CHARLES A. BALZER, citizens of the United States, and residents of Cincinnati, in the county of Hamilton and State of Ohio, have invented a certain new and useful Glare Shield for Automobiles, of which the following is a full, clear, and exact description, reference being had to the drawings forming part of this specification.

Our invention relates to the provision of a shield for preventing light glare in motor vehicles, said shields being used chiefly for the prevention of glare from the sun when near the horizon and also any lights from above, which have a tendency to shine into the eyes of a driver or to set up refractive rays of light in snow, rain or fog on a wind shield.

Among other objects of the invention is the provision of a simple form of shield readily attachable to closed body or open top motor vehicles, or other road vehicles, boats and the like. It is also the object to provide a simple device for adjusting the shield or shade so that it can be placed at the elevation desired, affording the maximum of protection without preventing a view of the road.

These objects and other advantages to be noted we accomplish by that certain construction and arrangement of parts to be hereinafter more specifically pointed out and claimed.

In the drawings,

Figure 1 is a perspective view showing the device as attached to a closed body automobile.

Figure 2 is a detail perspective of one corner of the device showing the hinged and adjusting bars.

Figure 3 is a perspective of the device mounted on an open top automobile.

Figure 4 is a view in elevation of the adjusting arms spread out.

Figure 5 is a side view of the parts shown in Figure 4.

In the provision of a shield or shade we preferably form a piece of thin wood 1 into the desired shape and cover it with a sheet of waterproof leatherized fabric 2, said fabric being secured around the edges of the board, and the board edges finished and protected by a metal binding 3, crimped into the wood and fabric all of the way around. This structure we find permanent, sufficiently stiff and attractive for the desired use. It is inexpensive to manufacture and well within the range of operations of the ordinary carriage or automobile body and curtain shop.

The hinge member and adjusting and supporting arms are formed of a hinge plate 4 formed as a double leaf, and arms 5 and 6, each arm being hinged by a suitable pintle 7 to the hinge plate 4, formed as a double leaf.

The arm 5 is riveted securely, or otherwise firmly attached to the board, and carries firmly attached therewith or thereto a screw post $7^a$. The arm 6 is provided with a slot 8, through which the screw post will pass and slide, there being a wing nut 9 to secure the arms together in desired position on the screw post in the slot.

With this construction we may secure our hinge plates either to the vertical fall-board 10 at the top of a closed body car 11, just above the wind shield, or we may attach the hinge plates to a cross bar 12 extending horizontally past the forward end of an open vehicle top, as shown at 13.

In either position the arms may be swung to a position to extend in a slanting or awning-like manner over the front of the vehicle wind shield 14, since the shield itself as carried by the arms may be swung and adjusted by tightening the wing nut 9 into positions parallel with the hinge plate extending from either end of said plate.

Thus whether the hinge plate is mounted vertically or horizontally the shield may be swung so as to lie along the wind shield, or at right angles thereto, the slot 8 being long enough to accomplish this full range of movement.

In other words, the movement of the arms as limited by the screw post sliding in the slot is through half of a complete circle.

The method of adjustment is exceedingly simple without special clamping hinges, as used in wind shields, and will not rattle so long as the hinge pintles remain intact, which insures a practically rattle proof structure during the full life of the shield.

It is believed that in the above matter we have pointed out the advantages of our structure and a complete adaptation of the principles of our invention so as to enable others skilled in the art to construct and mount the same, and we do not wish to limit ourselves in the scope of the claims that follow because of a failure to point out equivalent structures in describing said adaptation:

Having thus described our invention, what we claim as new and desire to secure by Letters Patent, is:—

1. In a device of the character described, a shield member, an arm secured to said shield member, a plate secured to the car body, said plate being formed with two sets of hinge knuckles to one of which sets the arm is hinged, and another arm hinged to the other set of knuckles, and adjustable means for securing said other arm to the shield member in desired adjusted positions thereof on said hinge.

2. In combination with a shield section of the character described, a mounting element comprising a pair of arms, and a double hinge hinging both of said arms together, means for securing one of said arms to the shield section, and a slot in the other arm, and a screw post on the one arm engaging in the slot, and a wing nut for clamping the said post in desired positions in the slot.

3. In combination with a shield section of the character described, a mounting element comprising a pair of arms, and a double hinge hinging both of said arms together, means for securing one of said arms to the shield section, and a slot in the other arm, and a screw post on the one arm engaging in said slot, and a wing nut for clamping the said post in desired positions in the slot, said hinge and slot being arranged to permit a substantial half circle swing of the arms thereon, for the purpose described.

HENRY W. VOSS.
CHARLES A. BALZER.